(12) United States Patent
Alkas

(10) Patent No.: US 9,368,049 B2
(45) Date of Patent: Jun. 14, 2016

(54) LEVER LOCK FOR DISPLAY STRUCTURES

(71) Applicant: NIMLOK CHICAGO, Niles, IL (US)

(72) Inventor: Dean Alkas, Oak Forest, IL (US)

(73) Assignee: Nimlok Chicago, Niles, IL (US)

(*) Notice: Subject to any disclaimer, the term of this patent is extended or adjusted under 35 U.S.C. 154(b) by 412 days.

(21) Appl. No.: 13/840,220

(22) Filed: Mar. 15, 2013

(65) Prior Publication Data

US 2014/0259622 A1  Sep. 18, 2014

(51) Int. Cl.
 *F16B 7/04* (2006.01)
 *G09F 15/00* (2006.01)
 *F16B 2/18* (2006.01)

(52) U.S. Cl.
 CPC ............ *G09F 15/0068* (2013.01); *F16B 2/185* (2013.01); *F16B 7/0473* (2013.01); *Y10T 29/49947* (2015.01); *Y10T 403/595* (2015.01)

(58) Field of Classification Search
 CPC .... G09F 15/0068; F16B 2/185; F16B 7/0473; Y10T 403/595; Y10T 29/49947
 See application file for complete search history.

(56) References Cited

U.S. PATENT DOCUMENTS

| | | | | |
|---|---|---|---|---|
| 8,573,879 B2* | 11/2013 | Chang | ................... | B62K 25/02 301/124.2 |
| 2006/0113504 A1* | 6/2006 | Tollin | ..................... | F16B 2/185 251/257 |
| 2007/0116512 A1* | 5/2007 | Katzenstein | ........... | A61G 13/12 403/322.4 |
| 2009/0115241 A1* | 5/2009 | Kanehisa | ............... | B62K 25/02 301/124.2 |
| 2011/0268496 A1* | 11/2011 | Caveney | .............. | H02G 3/0608 403/322.4 |
| 2012/0321373 A1* | 12/2012 | Chang | ................... | B62K 25/02 403/106 |

* cited by examiner

Primary Examiner — Ryan J Walters
(74) Attorney, Agent, or Firm — Leydig, Voit & Mayer, Ltd.

(57) ABSTRACT

A lever lock is used for attaching first and second support elements in a display structure. The lever lock includes a body that attaches to a side of the first support element. A shaft extends from the body and is oriented to pass through the slot. A foot is disposed at an end of the shaft that is remote from the body and is configured to operatively engage a side of the second support element so as to provide a clamping force on the second support element against the first support element. A lever is coupled to the body and configured to rotate between first and second positions. A linkage connecting the lever with the shaft converts the rotation of the lever into a movement of the shaft through a translation and axial rotation so as to move the foot between engaging and disengaging positions.

12 Claims, 8 Drawing Sheets

LEVER LOCK FOR DISPLAY STRUCTURES

FIELD

The present invention relates to support elements for portable or permanent displays, such as those used in trade shows, and particularly relates to an attachment mechanism in the form of a lever lock for holding display support structures together.

BACKGROUND OF THE INVENTION

A typical display structural member or support element for a display is often in the form of a pulltruded aluminum beam having a generally rectangular cross section. The beam internally forms a generally rectangular hollow channel that is surrounded on two or more sides by open channels. The open channels may extend along the entire length of the structural member and serve as anchoring features for adjustably connectable clamps and other locking devices, such as those used to mount display panels, shelves, lighting, tables, and other exhibit booth elements to the support structure.

While existing clamps and locking devices are sufficient for connecting the support elements of the displays, they often require several steps to operate and may require specialized tools for securing the support elements. Thus, there is a need for a locking device that can secure support elements together that operates quickly and easily.

SUMMARY

In an embodiment, the present invention describes a lever lock for attaching first and second support elements in a display structure, where the first support element includes a first side having a slot disposed therein and the second support element includes a second side having another slot disposed therein. The lever lock includes a body having an attachment for securing the body to the first side of the first support element. A shaft extends from the body and is oriented with respect to the attachment of the body to pass through the slot of the first support element. A foot is disposed at an end of the shaft that is remote from the body. The foot is configured to operatively engage the second side of the second support element so as to provide a clamping force on the second support element against the first support element. A lever that is coupled to the body is configured to rotate between first and second positions. A linkage connecting the lever with the shaft is operable to convert a rotation of the lever to a spiral movement of the shaft having angular and axial displacement components so as to move the foot between engaging and disengaging positions.

BRIEF DESCRIPTION OF THE SEVERAL VIEWS OF THE DRAWING(S)

DETAILED DESCRIPTION OF THE INVENTION

Figure 1:
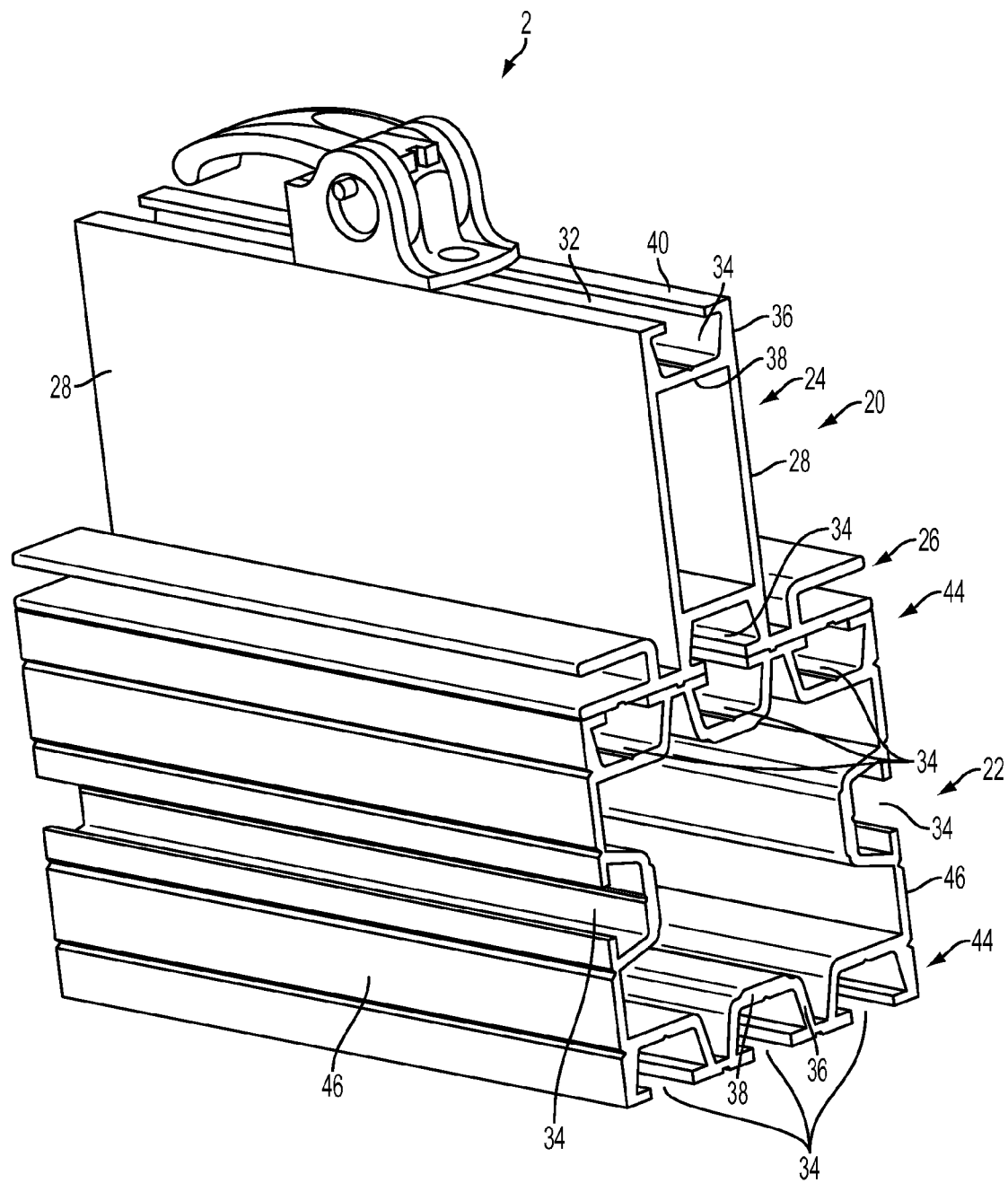
FIG. 1 shows a perspective view of a lever lock holding two support elements together.
Figure 2:
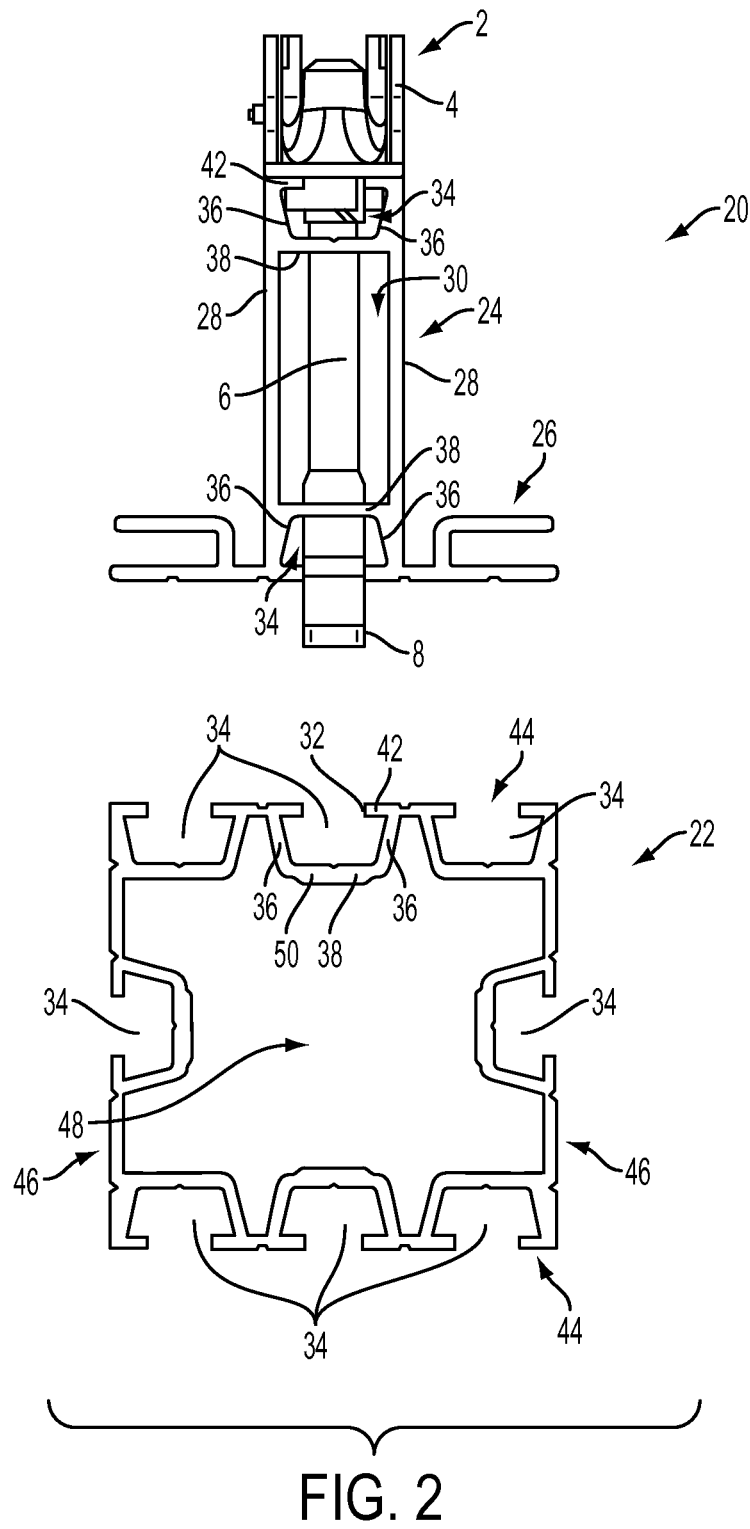
FIG. 2 shows a side view of the lever lock and first support element before it is connected to a second support element.
Figure 3:
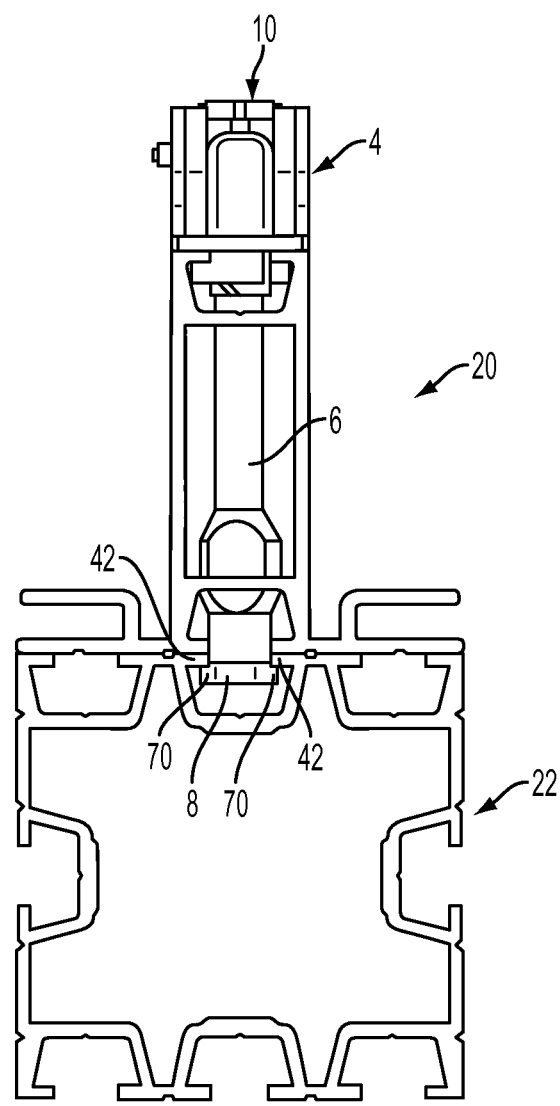
FIG. 3 shows a side view of the support elements of FIG. 2 in a connected position.

FIGS. 1-3 show a lever lock 2 connecting first and second support elements 20, 22. The lever lock 2, much of which is obscured in FIG. 1, is shown removed in FIG. 4. The lever lock 2 operates by securing the second support element 22 to the first support element 20. In the illustrated embodiment, the lever lock 2 clamps the second support element 22 against the first support element 20 and holds the second support element 22 in place. To achieve the desired connection, the lever lock 2 includes an upper body 4 that fixes against a first surface of the first support element 20. A shaft 6 extending from the upper body 4 passes through a portion of the first support element 20 to connect to the second support element. At the end of the shaft 6 is a foot 8. The foot 8 is adapted to secure the lever lock 2 to the second support element 22 so as to connect the first and second support elements 20, 22 to one another by a compressive force between the upper body 4 and the foot 8. A lever 10, supported on the upper body 4, interacts with the shaft 6 through a linkage 12 (see FIGS. 9 and 10) to engage and disengage the clamping of the foot 8 by a rotation of the lever 10.

In FIGS. 1-3, the two support elements 20, 22 are illustrated as portions of structural frame elements that may be used to support small display elements such as signs or video screens. Alternatively, the illustrated lever lock 2 can be designed to connect the first support element 20 to a variety of different structures that are appropriately configured, such as larger structural supports. Moreover, portions of the lever lock 2, particularly the length of the shaft 6, can be adjusted for use with different support elements. Each of the support elements 20, 22 shown in FIGS. 1-3 is in the form of an elongate beam. For clarity, only a small section of each beam is shown. The beam cross section of the first support element 20 is T-shaped, which is shown inverted in FIGS. 1-3. The T-shaped support element 20 includes a stem 24 extending from a flange 26. The stem 24 includes two lateral sides 28 surrounding a central hollow opening 30. Each of the opposite ends of the support includes a channel 34 formed adjacent to the central hollow opening 30. The channels 34 are delimited on either side by walls 36 and are closed off by a web 38. In support element 20, the side walls 36 of the channel 34 form extensions of the lateral sides 28 of the stem 24. Opposite the web 38, the channels 34 open through a slot 32 disposed in a surface 40 of the support element 20 (see FIG. 1). The slot 32 is narrower than the width of the channel 34, which results in a flange 42 that is formed on each side of the slot 32 on the open side of the channel 28. Both the foot 8 of the lever lock shaft 6 and the upper body 4 of the lever lock 2 attach to the support elements 20, 22 at the slot 32 by engaging the flanges 42, as described in more detail below.

In the illustrated embodiment, the second support element 22 has a different configuration than the first support element 20, and is generally square shaped. This particular support element includes upper and lower sides 44 and two lateral sides 46. The second support element has a multiplicity of channels 34 and corresponding slots 32. Specifically, each of the upper and lower sides 44 of the second support element includes three slots 32 that open into channels 34, and each of the lateral sides 46 includes an additional slot 32 and corresponding channel 34. A hollow opening 48 is formed within second support element 22 such that many of the sidewalls 36 of the channels 34 are formed by dedicated C-shaped structures 50 that define the channels 34.

While it may be advantageous for the slot 32 and channel 34 to be particularly dimensioned in order to operate cooperatively with the lever lock 2, other dimensions of the support members 20, 22 can take a large variety of different forms. For example, the two support elements are interchangeable, so that the body 4 of the lever lock 2 attaches to the rectangular support element and the foot 8 of the shaft 6 engages the T-shaped support element. Moreover, the two support elements can have the same shape, or can have entirely different shapes than those shown. In certain embodiments, the cross section of the support elements can be much larger or smaller than the variants shown so long as the shaft 6 has an appropriate length to extend from a surface of one support element and reach a slot in the other support element. Further, the support elements 20, 22 can be formed without discrete channels as in the illustrated embodiment, and instead have a hollow opening that extends across the entire cross section of the beam. In such an embodiment, the surfaces of the support elements 20, 22 could be held together by spaced connections instead of the web 38 or C-shaped structures 50 shown in the drawings.

In operation, the lever lock 2 is initially coupled to one side of the support element 20 at an open slot 32, with the shaft 6 extending through both the slot and the center of the support element 20 to an opposing side of the support element. To accommodate the insertion of the shaft 6, the webs 38 include openings formed, for example, by round or slotted holes. The end of the shaft 6 extends from the support element 20 sufficiently to couple the foot 8 at the end of the shaft 6 to the second support element 22 (see FIGS. 2 and 3). With the lever 10 in an open position, the end of the shaft 6 is insertable through a slot 32 in the second support element 22 (see FIG. 2). To securely couple the support elements 20, 22 together, the lever 10 is rotated to a closed position, which causes the shaft 6 to simultaneously rotate about its axis and to retract in the axial direction so that the foot 8 of the shaft is turned and pulled against the flanges 42 that border the open slot 32 in the second support element (see FIG. 3).

Figure 4:
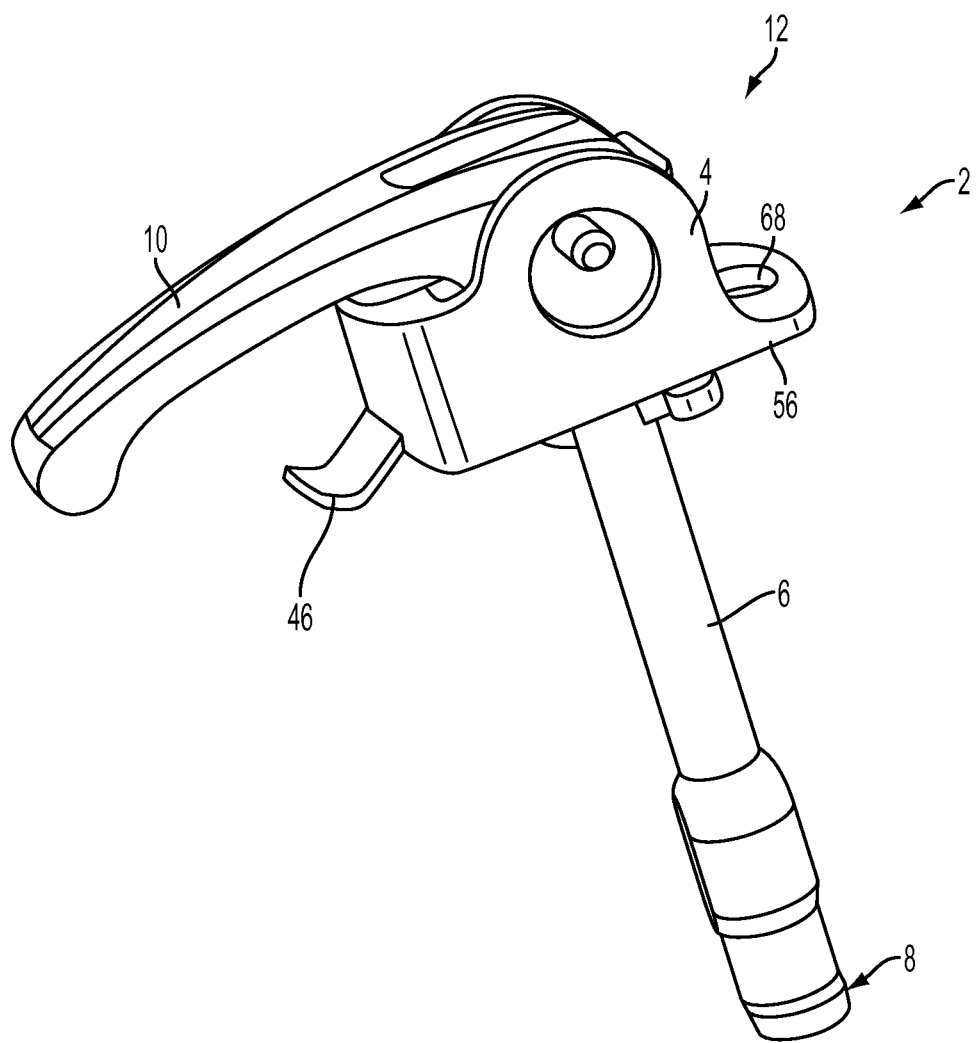
FIG. 4 shows a perspective view of the lever lock of FIG. 1.
Figure 6:
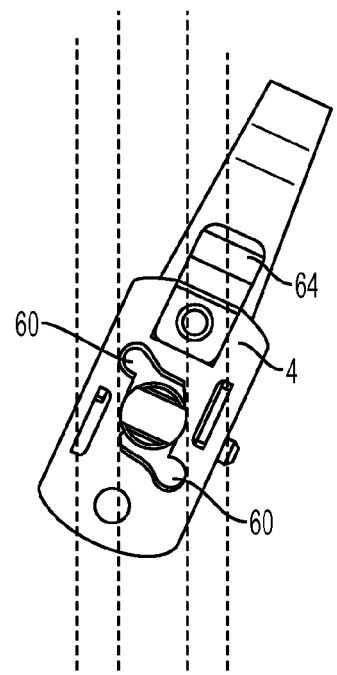
Figure 7:
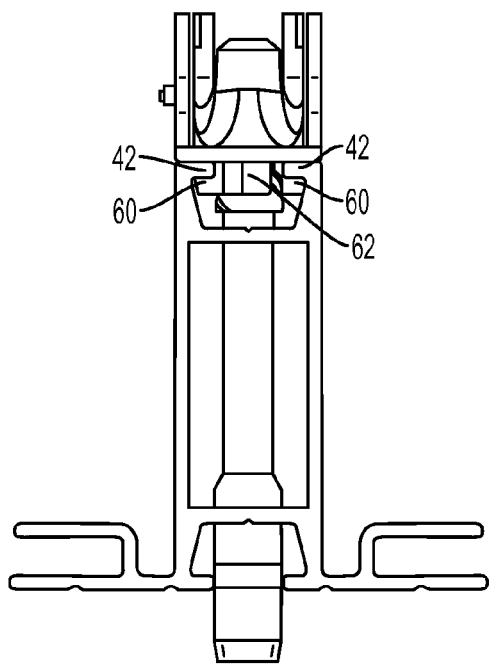
FIGS. 7 and 8 show side and bottom views of the lever lock of FIG. 1 after it is connected to the support element.
Figure 8:
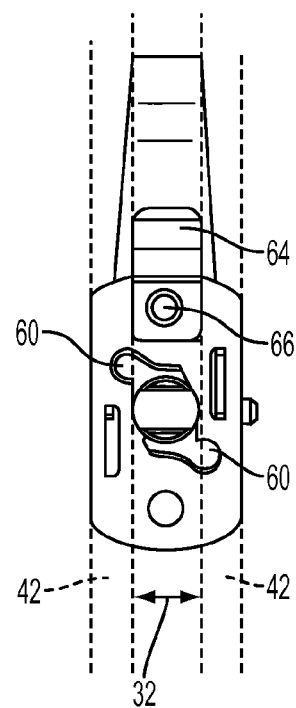

As discussed above, the lever lock 2 attaches to the first support element 20 through the body 4. In the illustrated embodiment, as shown in FIG. 4, body 4 also retains the remaining components of the lever lock 2 together, specifically the shaft 6, the lever 10 and the components of the linkage 12 that couple the shaft 6 and the lever 10. The body 4 has a base 56 that is adapted to rest against a surface 40 of the support element 20 around the corresponding slot 32. The body 4 is coupled to the first support element 20 using an attachment, which is embodied in FIGS. 5-8 as a pair of arms 60. By attaching the body 4 to the support element, all of the components of the lever lock 2 are held securely on the first support element. The arms 60 are adapted to engage flanges 42 of the support element 20 that border the corresponding slot 32. Each of the arms 60 is spaced from the base 56 by a corresponding support 62 having a height that is substantially equal to the thickness of the flanges 42. Accordingly, the flanges 42 on either side of the slot 34 can be engaged by a respective one of the arms 60 and the base of the body 4 by an interference fit, as shown in FIG. 7.

Figure 5:
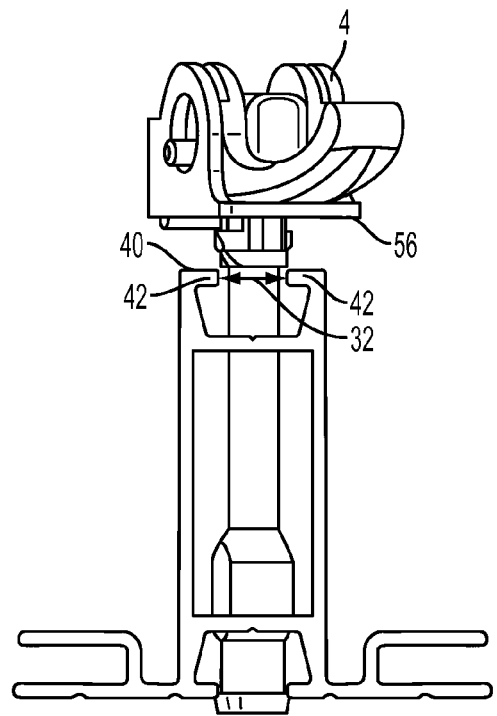
FIGS. 5 and 6 show side and bottom views of the lever lock of FIG. 1 before it is coupled to the first support element.

In the illustrated embodiment, the arms 60 are rotationally symmetrical about an axis of the shaft 6. As a result, the body 4 can be rotated, as shown in FIGS. 5 and 6 so that the arms 60 are aligned with the flanges 42 and will fit through the slot 34. In this position, the body 4 can be lowered onto the support element 20 until the arms 60 have passed through the slot 32 and base 56 of the body rests against the surface 40 of the first support element. To secure the lever lock 2 to the first support element 20, the body 4 can then be rotated back to the position shown in FIGS. 7 and 8, where the arms engage the flanges 42.

Once the body 4 is releasably engaged with the support element 20, the body 4 can be prevented from rotating back to the angled insertion orientation by interference of a flexible tongue 64 with the flanges 42. The tongue 64 extends from a front of the body 4 just above the base 56 and is adapted to be inserted into the slot 34 that is adjacent the body 4. Preferably, a width of the flexible tongue 64 is approximately equal to a width of the slot 32 such that the tongue 64 will prevent the lever lock body 4 from rotating after the tongue 64 is inserted into the slot 32. For example, the flexible tongue 64 may be at least 80% of the width of the slot 32. In order to allow the tongue 64 to be easily placed in the slot 32, it is preferably formed of a ductile material. Accordingly, in one embodiment, the tongue 64 can be formed from one material while the body can be formed of another material, where the material of the tongue is more ductile than the material of the body. In the illustrated embodiment, the tongue 64 is attached to the body by a fastener, such as a screw 66 (see FIG. 9). For a more permanent connection of the lever lock 2 to the first support element 20, the body 4 of the lever lock 2 can include an aperture 68 for holding the base 56 against the support element 20 using a fastener, such as a bolt.

Figure 9:
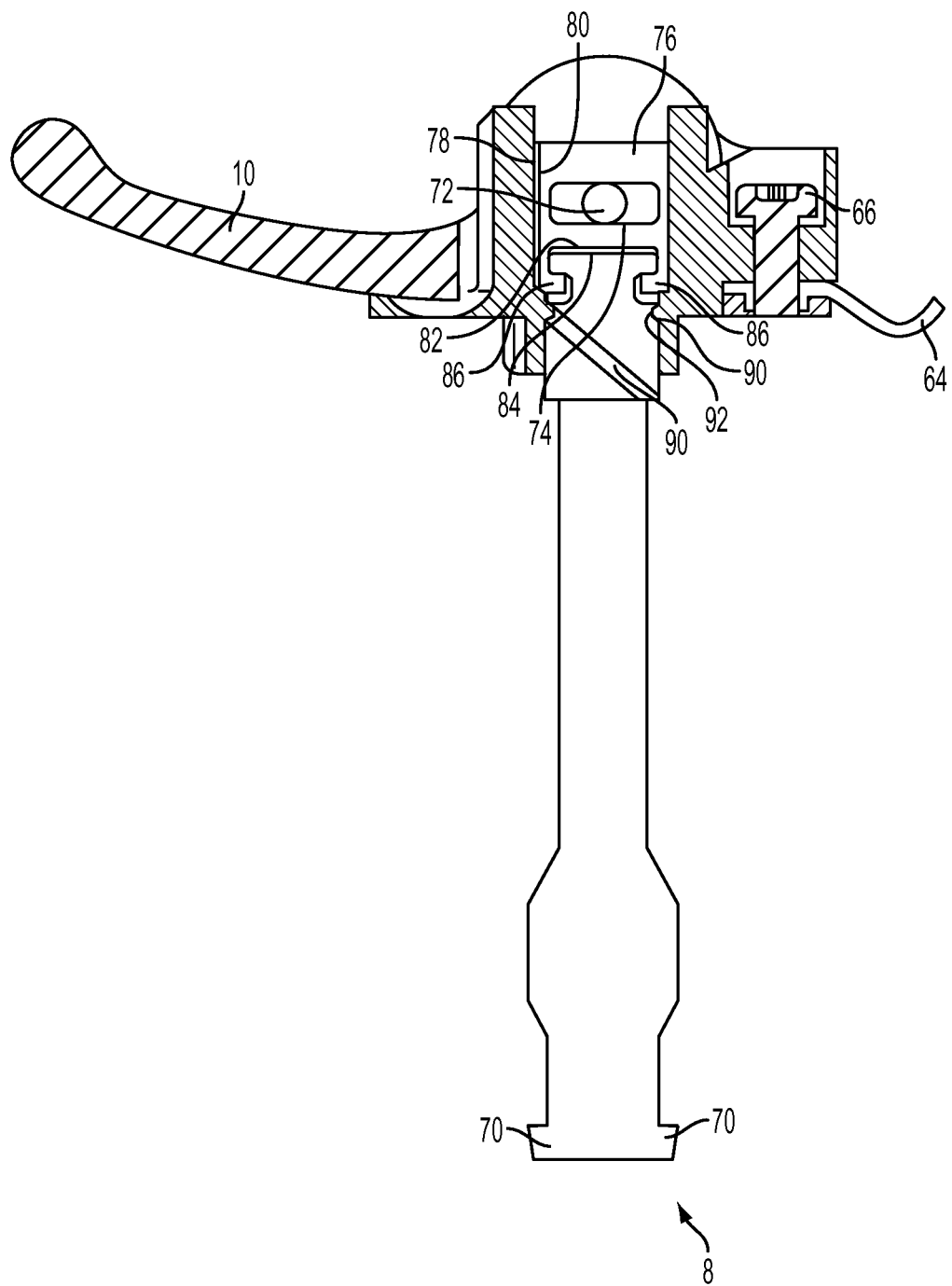
FIG. 9 shows a cross sectional view of the lever lock of FIG. 1 in an open position.

With the body 4 fixed in place on the first support element 20, the resulting assembly is ready for attachment to the second support element 22, as illustrated by FIGS. 2 and 3. In FIG. 2 the lever lock 2 is fixed in place on the support element 20 with the foot 8 of shaft 6 extending away from a lower surface of the first support element 20. The foot 8 is configured as a T-shaped head and includes two abutments 70 that extend outward from the shaft 6, as shown in FIG. 9. In the configuration shown in FIG. 2, the lever 10 of the lever lock 2 is disposed in an open position. As a result, the shaft 6, which is linked to the lever 10, is oriented such that the abutments 70 of the foot 8 are aligned with the slot 32 of the upper channel 34 in second support element 22. This allows the foot 8 to be inserted into the channel 34 until the upper face of support element 22 abuts the opposing lower face of support element 20. Once the two support members 20, 22 are adjacent, the lever 10 can be moved to the closed position. During the actuation of the lever 10, the linkage 12 converts the rotation of the lever to an actuation shaft 6, causing the shaft to both raise and turn in a spiral fashion. The resulting end position, shown in FIG. 3, places the abutments 70 of the foot 8 tightly against the flanges 42 of the corresponding channel 34 of the second support element 22. With the lever lock in the locked position, a tensile force extends through the shaft 6 so that surfaces at opposing ends of the lever lock can press the two support elements 20, 22 against one another. Specifically, the base 56 of the lever lock body 4 presses against a top surface of the first support element 20 and the foot 8 of the lever lock shaft 6 presses against an inside surface of the second support element 22 in an opposite direction. These opposing forces provide an adequate compression to hold the two support elements 20, 22 securely together.

Figure 10:
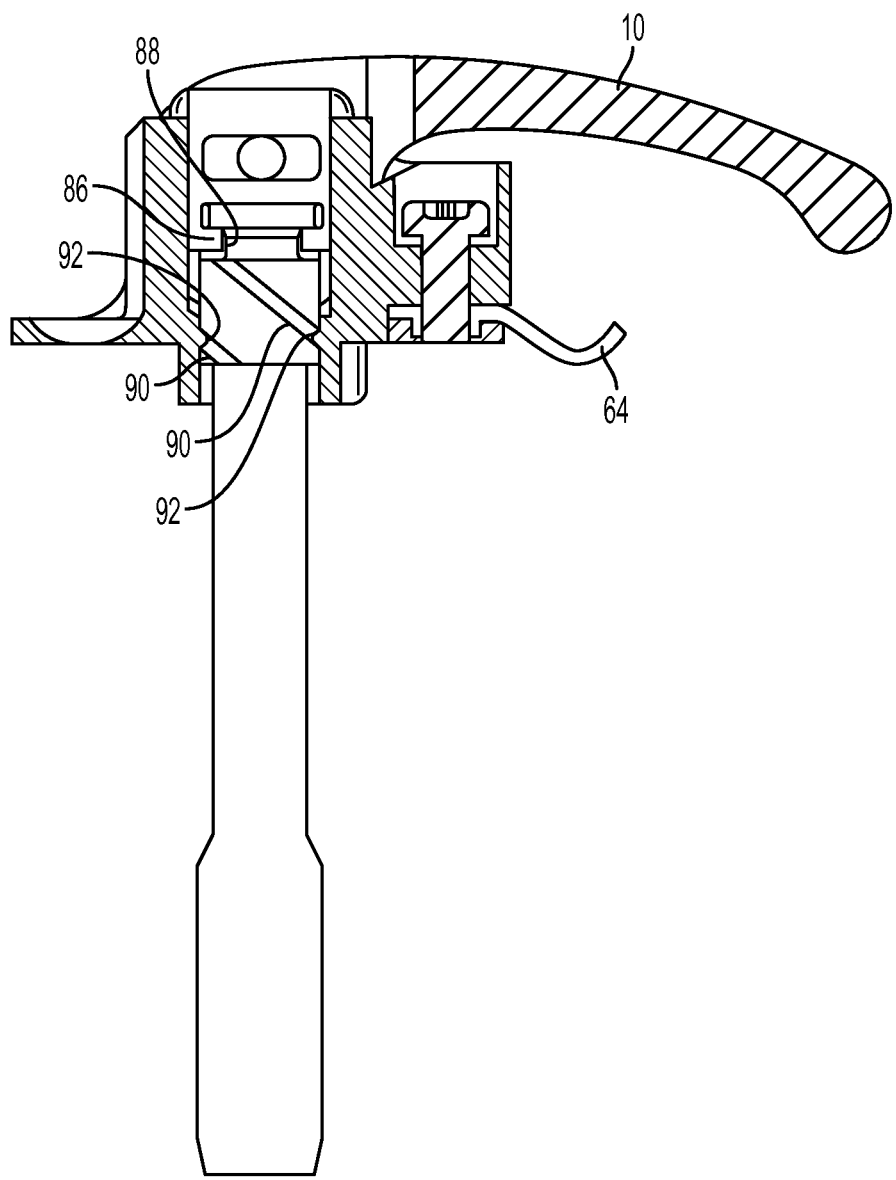
FIG. 10 shows a cross section view of the lever lock of FIG. 9 in a closed position.

The components and operation of the linkage 12 that converts the rotational motion of the lever 10 into the axial translation and axial rotation of the shaft 6 are illustrated in FIGS. 9 and 10. The linkage 12 is established by a scotch yoke formed by a pin 72 that is held within a pin slot 74 disposed in a sliding yoke 76. The pin 72 interacts with the lever 10, while the sliding yoke 76 interacts with the shaft 6 so that the movement of the lever 10 is transferred through the scotch yoke to the shaft 6.

The sliding yoke 76 is held within the body 4 and constrained to move in only one direction along the axis of the shaft 6. The constraint of the sliding yoke 76 can be facilitated by the outside surface 78 of the yoke and the corresponding inner surface 80 of the opening in which the yoke 76 is held. This constraint can be further strengthened by including a groove that extends along the sliding direction on the yoke 76 or the body 4, and a corresponding ridge on the other of the yoke 76 or body 4. For example, in the illustrated embodiment, grooves are disposed on opposing sides of the yoke 76 and corresponding ridges are formed in the opening of the lever lock body 4.

Reciprocating movement of the sliding yoke 76 along its constrained path is actuated by a movement of the pin 72 within the pin slot 74. The pin 72 is fixedly attached to a portion of the lever 10, which is constrained by the body to rotate about a fixed axis. The pin 72 extends parallel to the axis of rotation of the lever 10 and, based on its attachment to the lever, follows an accurate path when the lever is rotated. Thus, in the illustrated embodiment, the pin 72 follows an arc from the lower position shown in FIG. 9 to the upper position shown in FIG. 10, which respectively correspond to the open and closed positions of the lever 10. As the pin 72 moves about the arc, the axial components of this movement force the sliding yoke 76 to correspondingly move axially. The pin 72 is laterally moveable along the arc without affecting motion of the yoke 76 by moving freely within the pin slot 74. In this way, the rotational movement of the lever 10 and associated movement of the pin 72 along the arc are converted into a linear translation of the sliding yoke 76 along the axis of the shaft 6.

The linear movement of the sliding yoke 76 is further transformed into both a linear translation and an axial rotation as the movement is transferred to the shaft 6. Specifically, the linear reciprocation of the yoke 76 causes the shaft 6 to likewise reciprocate along the shaft axis. However, the shaft 6 is further constrained so that it also rotates about the shaft axis as it reciprocates. To enable this movement the engagement of the yoke 76 and the shaft 6 is a sliding connection, which allows the yoke 76 to introduce its linear movement to the shaft 6 without hindering shaft rotation. In the illustrated embodiment, the connection between the yoke 76 and the shaft 6 is provided by a first portion including an abutting surface 82 at the top of the shaft which rests against a corresponding surface 84 at the bottom of the sliding yoke 76. As the yoke 76 moves toward the shaft 6, the surface 84 of the yoke 76 pushes against the surface 82 of the shaft causing the shaft to move away from the body 4. The connection also includes a second portion that causes the yoke 76 to pull the shaft as it moves in a direction away from the shaft. This second portion of the connection is provided by a pair of hooks 86 disposed on the sliding yoke 76 that extend around the top of the shaft and are inserted into a groove 88 disposed near the top of the shaft 6. The groove 88 is formed in a circumferential surface of the shaft. Thus, as the sliding yoke 76 moves in a direction away from the shaft 6, the hooks 86 pull the shaft along with the yoke 76 by way of their insertion in the groove 88. Of course, in an alternative embodiment, the hooks may be disposed on the shaft and the groove disposed in the sliding yoke. Further, as an alternative to the groove, the hooks 86 could wrap around a disk disposed at the end of the shaft 6.

In cooperation with the movement provided by the yoke 76 to oscillate the shaft 6 along its axis, the body 4 of the lever lock also constrains the shaft 6 to rotate about its axis as the shaft reciprocates. In the illustrated embodiment, this constriction is provided by a helical guide 90 disposed in an outer surface of the shaft 6 and a corresponding constraint 92 disposed on the body 4. The particular guide 90 used in the embodiment shown is a helical groove formed on the outer surface of the shaft 6. The constraint 92 is a protrusion disposed on the body 4. The protrusion 92 rides within the helical groove 90 and drives the shaft to rotate as the shaft moves through the body so that the protrusion 92 remains within the groove 90. As an alternative, the helical guide 90 could be disposed on the body 4 and the constraint 92 disposed on the shaft. Further, instead of a helical groove, the guide 90 could be provided by a helical ridge and the constraint could be formed by a receptacle that holds the ridge.

Thus, in the embodiment shown in the drawings, the linkage 12 that converts the rotation of the lever 10 to the translation and rotation of the shaft 6 is provided by the lever 10, the pin 72, the sliding yoke 76, the portions of the body 4 that constrain the yoke 76, the protrusion 92 of the body 4 and the helical groove 90 disposed on the shaft.

Figure 11A:
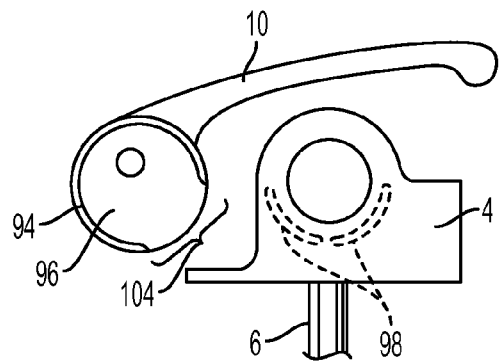
FIG. 11a shows the lever of the lever lock of FIG. 1 separated from the body of the lever lock.

As set forth above, the lever 10 is held within the body 4 in a fashion that allows rotation of the lever 10 about an axis of rotation that is parallel with the pin 72 of the scotch yoke. Components that retain the lever 10 include a pair of circular ridges 94 disposed on opposing outer walls 96 of the lever that cooperate with arc-shaped ridges 98 on inner walls of the body 4, as shown in FIG. 11*a*. When the lever 10 is properly in place in the body 4, the arc or circle of each ridge is aligned with the axis of rotation of the lever 10. In this embodiment, the radius of each circular ridge 94 is slightly larger than the radius of the corresponding arc-shaped ridge 98 such that the arc-shaped ridges 98 are concentrically held inside the circular ridges 94 and ride along the circular ridges 94 as the lever is rotated. Once the inner arc-shaped ridges 98 of the body 4 are disposed within the circular ridges 94 of the lever, the respective corresponding ridges provide an obstruction to the separation of the lever from the body. Further, so long as the pair of arc-shaped ridges 98 covers an adequate portion of the circle that surrounds the axis of rotation, the lever 10 will also be held in place on the axis of rotation while these ridges are engaged.

Figure 11B:
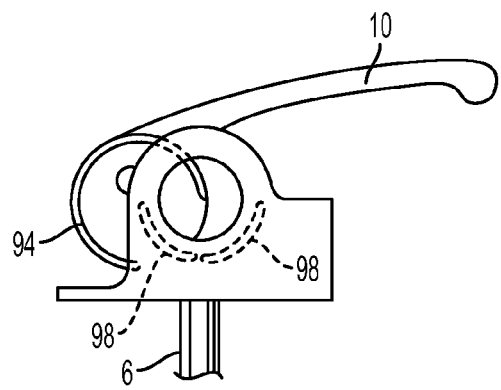
FIG. 11b shows the lever during an insertion into the body of the lever lock of FIG. 1.
Figure 11C:
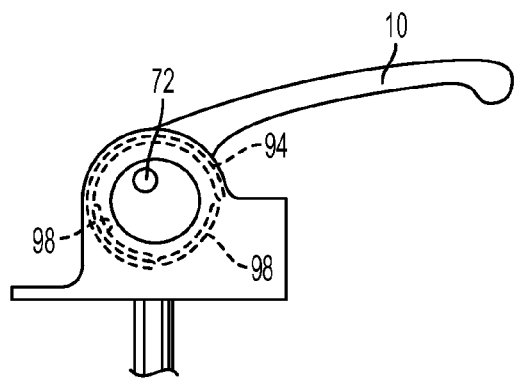
FIG. 11c shows the lever after it is inserted into the body of the lever lock of FIG. 1.

Insertion of the lever 10 into the body 4 is illustrated by FIGS. 11*a*-11*c*. In order to insert the lever 10 into the body 4, so that the inner arc-shaped ridges 98 of the body can pass through to the inside of the outer circular ridges 94 of the lever 10, each of the circular ridges 98 includes an opening 104 extending about a segment of the circle. To join the lever and body, the lever 10 is inserted in a specific direction and at a specific location where both arc-shaped ridges 98 are able to pass through the opening 104 in the circular ridges 94. Once the lever is in place within the body and the ridges 94, 98 are aligned, the insertion of the pin 72 through the lever 10 provides one final constraint to hold the lever in place.

The invention also relates to a method of using the lever lock 2 to hold two support elements 20, 22 together. In an exemplary method, the lever lock 2 is first coupled to the first support element 20 by inserting the shaft 6 of the lever lock 2 through an opening in the support element 20 until the body 4 is near a slot 32 disposed on a surface first support element 20. The body is then aligned with the slot 32 so that two arms 60 disposed beneath a base of the body can pass through the slot.

Once the base 56 of the body has reached the surface containing the slot 32, the body is rotated so that the arms 60 engage flanges 42 that surround the slot 32. The first support element 20 and attached lever lock 2 are then moved into a vicinity of the second support element 22 and the lever 10 is placed in the open position. A foot 8 of the lever lock 2 is then aligned with a slot 32 formed in the second support element 22 and the first and second support elements are brought together until opposing surfaces of the support elements abut. The lever 10 is then rotated from the open position to the closed position, which causes the shaft 6 of the lever lock to retract and rotate so that the foot 8 of the lever lock moves to an engaging position with a flange 42 bordering the slot 32 in the second support element 22. With the lever lock in the locked position, a tensile force extends through the shaft 6 so that surfaces at opposing ends of the lever lock press the two support elements 20, 22 against one another holding the support elements securely together.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A lever lock for attaching first and second support elements in a display structure, the first support element including a first side having a slot disposed therein and the second support element including a second side having another slot disposed therein, the lever lock comprising:

a body including an attachment for securing the body to the first side of the first support element;

a shaft extending from the body and oriented with respect to the attachment of the body to pass through the slot of the first support element;

a foot disposed at an end of the shaft that is remote from the body, the foot being configured to operatively engage the second side of the second support element so as to provide a clamping force on the second support element against the first support element;

a lever coupled to the body and configured to rotate between first and second positions; and a linkage connecting the lever with the shaft, the linkage being operable to convert the rotation of the lever between the first and second positions to a movement of the shaft through a translation along an axis of the shaft and a rotation about the axis of the shaft so as to move the foot between engaging and disengaging positions;

wherein the linkage includes a scotch yoke operable to convert the rotation of the lever into an axial translation, the scotch yoke including:

a sliding yoke slidably disposed within the body, the sliding yoke including a pin slot extending in a direction perpendicular to an axis of the shaft; and a pin connected to the lever and extending parallel to an axis of rotation of the lever so as to move about an arc with the rotation of the lever, the pin being disposed in the pin slot of the sliding yoke and operable to move the sliding yoke through the translation as the pin moves about the arc.

2. The lever lock recited in claim 1, wherein the attachment for securing the body to the first side of the first support element includes:

a base configured to abut an outside surface of the first side of the first support element, and first and second arms disposed below the base on opposite sides of the shaft and extending in opposite directions, the first and second arms being offset such that a twisting of the body when the base abuts the outside surface of the first side of the support element moves the first and second arms into an attachment position under opposing flanges on opposite sides of the slot of the first support element.

3. The lever lock recited in claim 1, further comprising a flexible tongue attached to the body and operable to be removably inserted into the slot in the first support element and prevent rotation of the body with respect to the first support element when the body is attached to the first support element.

4. The lever lock recited in claim 3, wherein the body includes a first material and the flexible tongue includes a second material that is more ductile than the first material.

5. The lever lock recited in claim 1, wherein the linkage includes a constraint disposed on at least one of the body and the shaft, and a helical guide disposed on the other of the body and the shaft, the helical guide being configured to cooperate with the constraint so as to guide the shaft through the axial rotation as the shaft is moved along the axial direction.

6. The lever lock recited in claim 1, wherein the sliding yoke includes a holding element that rotatably holds a head of the shaft so as to transfer the translation of the sliding yoke to the shaft while allowing rotation of the shaft.

7. The lever lock recited in claim 6, wherein the linkage further includes a constraint disposed on at least one of the body and the shaft and a helical guide disposed on the other of the body and the shaft, the helical guide being configured to cooperate with the constraint so as to rotate the shaft as the shaft moves through the translation imposed by the sliding yoke.

8. The lever lock recited in claim 1, wherein the foot of the shaft includes a T-shaped head with a pair of abutments that extend to a width that is greater than a width of the slot of the second side of the second support element, and the T-head having a width that is shorter than the width of the slot of the second side of the support element.

9. An assembly comprising:
a first support element including a first surface having a first slot disposed therein;
a second support element including a second surface having a second slot disposed therein; and
a lever lock attaching the first and second support elements, the lever lock including a body with an attachment secured to the first side of the first support element about the first slot, a shaft extending from the body through the first slot of the first support element, a foot disposed at an end of the shaft that engages the second slot of the second support element and provides a clamping force on the second support element against the first support element, and a lever coupled to the body and configured to release the attachment of the second support element to the first support element by rotating the shaft and moving the foot of the shaft away from the second slot of the second support element upon movement of the lever to an open position;
wherein the movement of the shaft caused by the rotation of the lever is provided by a linkage including a constraint disposed on at least one of the body and the shaft, and a helical guide disposed on the other of the body and the shaft, the helical guide being configured to cooperate with the constraint so as to guide the shaft through the rotation as the shaft is moved away from the second slot; and
wherein the linkage includes a scotch yoke operable to convert the rotation of the lever into a translation, the scotch yoke including:
a sliding yoke slidably disposed within the body, the sliding yoke including a pin slot extending in a direction perpendicular to an axis of the shaft; and
a pin connected to the lever and extending parallel to an axis of rotation of the lever so as to move about an arc with the rotation of the lever, the pin being disposed in the pin slot of the sliding yoke and operable to move the sliding yoke through the translation as the pin moves about the arc.

10. The assembly recited in claim 9, wherein the attachment securing the body to the first surface of the first support element includes a base abutting the first surface, and first and second arms disposed below the base on opposite sides of the shaft and extending in opposite directions, the first and second arms being positioned at an offset distance under opposing flanges on opposite sides of the first slot of the first support element.

11. The assembly recited in claim 9, wherein the sliding yoke includes a holding element that rotatably holds a head of the shaft so as to transfer the translation of the sliding yoke to the shaft while allowing rotation of the shaft.

12. The assembly recited in claim 9, wherein the foot of the shaft includes a T-shaped head with a pair of abutments that extend to a width that is greater than a width of the second slot of the second support element, and the T-head has a width that is shorter than the width of the second slot of the support element.

* * * * *